United States Patent [19]
Naito et al.

[11] 3,786,466
[45] Jan. 15, 1974

[54] ELECTRICAL LEAKAGE DETECTING DEVICE

[75] Inventors: Shotaro Naito; Ryoji Kasama, both of Katsuta; Hiro Sato, Numazu, all of Japan

[73] Assignee: Hitachi, Ltd., Tokyo, Japan

[22] Filed: Mar. 17, 1972

[21] Appl. No.: 235,482

[30] Foreign Application Priority Data
Mar. 19, 1971 Japan.............................. 46/15142

[52] U.S. Cl. ........................... 340/255, 317/33 SC
[51] Int. Cl. ............................................ G08b 21/00
[58] Field of Search.................. 340/255; 317/27 R, 317/33 SC, 16

[56] References Cited
UNITED STATES PATENTS
| | | | |
|---|---|---|---|
| 1,748,763 | 2/1930 | Gilson............................ | 340/255 X |
| 3,611,036 | 10/1971 | Edson............................ | 340/255 X |
| 3,621,334 | 11/1971 | Burns et al...................... | 317/27 R X |

*Primary Examiner*—John W. Caldwell
*Assistant Examiner*—Daniel Myer
*Attorney*—Thomas E. Beall, Jr.

[57] ABSTRACT

A leakage detecting circuit for detecting leakage from a source of power, for example, a battery to a source of reference potential, for example, ground, which comprises a pair of voltage detecting circuits respectively connected to the positive and negative terminals of the battery to ground through first and second switching means respectively. The battery is insulated from ground, so that if a leakage path exists between the battery and ground, an electrical circuit is closed which includes a voltage detection device and one of the switching means. A voltage is thus applied to the voltage detecting device by closing the switching device. In normal operation, the circuit is open so that no voltage is applied to the voltage detecting device. In alternative embodiments, the voltage detecting devices comprise a neon tube and a photoconductor element responsive to the neon tube, or a coil in circuit with a Hall element.

11 Claims, 4 Drawing Figures

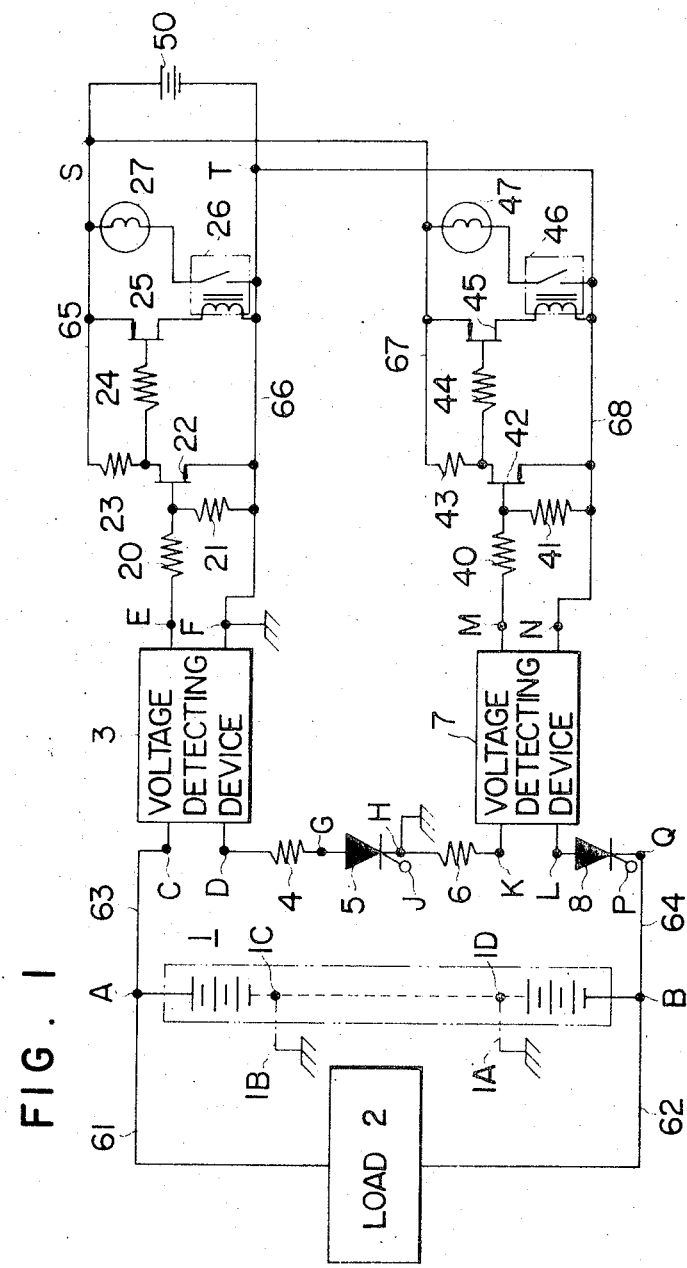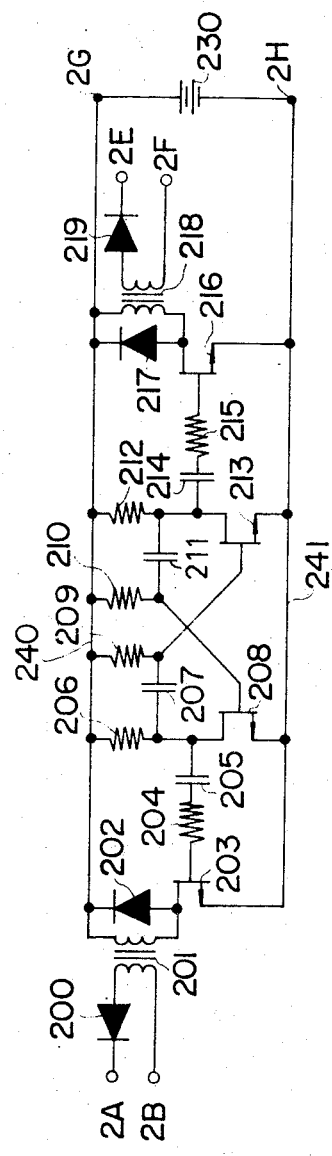
FIG. 1
FIG. 2

ELECTRICAL LEAKAGE DETECTING DEVICE

BACKGROUND OF THE INVENTION

This invention relates to leakage detectors. More particularly, this invention relates to leakage detectors capable of detecting the leakage from an isolated source of power to a source of reference potential, such as ground. Still more particularly, this invention relates to leakage detectors for detecting leakage from a battery to a frame body, for example, an electric car, thus to prevent shock hazards.

In an electric automobile using a battery for its source of power, the battery is electrically isolated from the body of the automobile. In such an arrangement, it is possible to cause a short circuit between the battery and the body of the automobile due to the leakage of electrolyte from the battery or for other reasons. When such leakage occurs, a current may flow in the body of the automobile to produce a current or potential difference which may cause a shock hazard.

It is known in the art that when a power source comprises a plurality of cells such as exist in a battery and each cell is insulated from ground and machines or circuits are driven by the source of power, an accident, for example, an electric shock, may be caused by leakage current between one or more cells and ground. Accordingly, it is an aim in the art to detect this leakage phenomenon.

Thus, it is a primary object of this invention to provide a device which detects leakage current from a source of power.

It is an initial object of this invention to provide a novel and useful circuit for detecting leakage current from a source of power to a source of reference potential.

These and other objects and advantages of the present invention will become apparent from a review of the accompanying drawings taken in conjunction with the following written description of the invention.

BRIEF SUMMARY OF THE INVENTION

A leakage detecting circuit according to the invention comprises voltage detectors respectively connected between the positive and negative terminals of the source of power and a source of reference potential such as ground, or the body of the automobile. When one or more cells or the source of power is grounded to the body or to the source of reference potential, a closed circuit is caused to occur. The closed circuit comprises the voltage detector, the cells between the terminal of the source of power to which the voltage detector is connected and the cell of the source of power which is grounded to the body or to ground and the ground or the body. By inducing a voltage between the input terminals of the voltage detector by the current flowing through these closed circuits, the leakage of the battery may be detected. A switching device, for example a thyristor, is connected in series between the voltage detector and ground. The output of the voltage detector is transferred to an indicator circuit. It is preferred that the indicator circuit be electrically disconnected from the voltage detecting circuit.

BRIEF DESCRIPTION OF THE DRAWINGS

In the drawings:

FIG. 1 is embodiment of the circuit for detecting the leakage of a source of power;

FIG. 2 is pulse generator circuit for driving the switching means of FIG. 1;

DETAILED DESCRIPTION OF THE EMBODIMENTS

Figure 4:
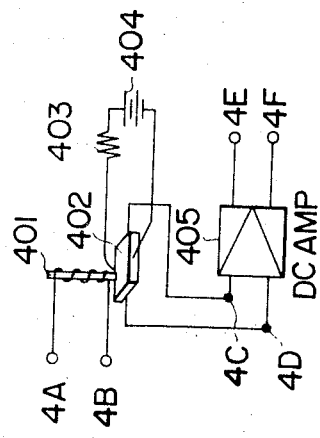
FIG. 4 is another alternative embodiment wherein the voltage detecting device comprises a coil in circuit with a Hall element.

FIG. 1 is a circuit diagram showing an embodiment of the present invention wherein a main battery is designated generally by the reference numeral 1 and includes positive and negative terminals A and B respectively. The main battery 1 is connected to a load 2, such as an electric motor for driving an electric car, by leads 61 and 62 respectively.

An input terminal C of a voltage detecting device 3 is connected to the positive terminal A of the battery 1 by lead 63. The other input terminal D of the voltage detecting device 3 is connected to a protective resistor 4 which in turn is connected to an anode G of a thyristor 5. The cathode H of the thyristor 5 is connected to a source of reference potential, i.e., ground. Throughout this description, the terms "source of reference potential" and "ground" are used interchangeably.

An output terminal E of the voltage detecting device 3 is connected to the base of a transistor 22 through a resistor 20. The other output terminal F of the voltage detecting device 3 is connected to ground. A resistor 21 is connected between the base of the transistor 22 and a lead 66 which is connected to the negative terminal of a battery 50 and ground. The collector of the transistor 22 is connected through a resistor 23 to a lead 65 which is connected to the positive terminal of the battery 50. The collector of the transistor 22 is also connected to the base of a transistor 25 through a resistor 24. The emitter of the transistor 22 is connected to the lead 66.

The emitter of the transistor 25 is connected to the lead 65 and its collector is connected to the lead 66 through a coil in a relay 26. An indicating lamp 27 is connected between the leads 65 and 66 through the contact of the relay 26.

The cathode Q of a thyristor 8 is connected through a lead 64 to the negative terminal B of the main battery 1. The anode of the thyristor 8 is connected to an input L of a voltage detecting device 7. The other input terminal K of the voltage detecting device 7 is connected to ground through a resistor 6.

An output terminal M of the voltage detecting device 7 is connected to the base of a transistor 42 through a resistor 40. The other output terminal N is connected to the lead 68 which is connected to the negative terminal of the battery 50 at node T. A resistor 41 is connected between the base of the transistor 42 and the lead 68. The emitter of the transistor 42 is connected to the lead 68 while its collector is connected to a lead 67 which is in turn connected to the positive terminal of the battery 50 at node S. The collector of the transistor 42 is also connected to the base of a transistor 45 through resistor 44. The emitter of the transistor 45 is connected to the lead 67, while its collector is connected through the coil of a relay 46 to the lead 68. An indicating lamp 47 is connected between the leads 67 and 68 through the contact of the relay 46.

The circuit of FIG. 1 operates in the following manner. Under the condition in which the battery 1 causes no leakage to ground, the series circuit comprising the voltage detecting device 3, the resistor 4, the thyristor 5, and the main battery is an open circuit. Similarly, the series circuit comprising the voltage detecting device 7, the resistor 6, the thyristor 8, and battery is also an open circuit. Under such an open circuit condition, no voltage is applied between the anode and cathode of either of the thyristors 5 and 8 respectively. Thus, when the gate J of the thyristor 5 is triggered, no voltage is generated between the input terminals C and D of the voltage detecting device 3 because of the open circuit state. Similarly, when the gate P of the thyristor 8 is triggered, no voltage is generated between the input terminals K and L of the voltage detecting device 7.

On the other hand, if a leakage occurs somewhere in the circuit, for example at point 1D, two closed circuits are caused to occur. The first circuit comprises the battery cells between the positive terminal A and the point 1D, the leakage line designated by the reference numeral 1A, the ground, the thyristor 5, the resistor 4, the voltage detecting device 3, and the lead 63. The second circuit comprises the battery cells between the point 1D and the negative terminal B, the leakage line 1A, the ground, the resistor 6, the voltage detecting device 7, the thyristor 8, and the lead 64. When the gate J of the thyristor 5 is triggered, the voltage is applied between the input terminals C and D of the voltage detecting device 3. The magnitude of the voltage applied is determined by the potential difference between the point 1D and the positive terminal A, less the sum of the potential drop across the resistor 4 and the thyristor 5 when the circuit is closed by the triggering of the thyristor 5. When such a voltage is applied to the input terminals C and D of the voltage detecting device 3, an output voltage between the terminals E and F is applied to the base of the transistor 22 which causes the transistor 25 to become conductive to energize the coil of the relay 26 and thus energize the lamp 27 by the closure of the contact of the relay 26.

Since the leakage at point 1D in the battery 1 is near the negative terminal D, the voltage applied to the voltage detecting device 7 is insufficient in magnitude to cause the device 7 to operate. As a result, the lamp 47 is either not illuminated or illuminated only slightly and less intensely than the lamp 27.

On the other hand, when the leakage occurs at point 1C, which is relatively near the positive terminal A, the voltage applied to the voltage detecting device 3 is too small to operate the voltage detecting device 3, while the voltage applied to the voltage detecting device 7 is large enough to operate the voltage detecting device 7. Therefore, the output voltage from the voltage detecting device 7 is applied to the base of the transistor 42 which drives the transistor 45 into conduction to energize the coil of the relay 46 thus to close its contact and energize the lamp 47.

FIG. 2 illustrates a pulse generator for driving the thyristors of FIG. 1. An astable multivibrator circuit comprises resistors 206, 209, 210 and 212, a pair of capacitors 207 and 211, and a pair of transistors 208 and 213 to form a pulse generating circuit. This circuit is energized by potential from a battery 230 through leads 240 and 241. A signal applied to the input terminals 2A and 2B through a diode 200 provides the input to a pulse transformer 201. The secondary of the pulse transformer 201 is connected between the lead 240 and the collector of a transistor 203. A diode 202 is connected in parallel with the secondary of the pulse transformer 201. The base of the transistor 203 is connected through a resistor 204 and a differential capacitor 205 to the collector of the transistor 208 in the astable multivibrator circuit.

The collector of the transistor 213 is connected to the base of a transistor 216 through a differential capacitor 214 and a resistor 215. The collector of the transistor 216 is connected to a pulse transformer 218 which includes a diode 217 connected across its primary. The secondary of the pulse transformer 218 is connected to the output terminals 2E and 2F through the diode 219. A pulse to trigger the thyristors is provided at the terminals 2E nd 2F.

Figure 3:
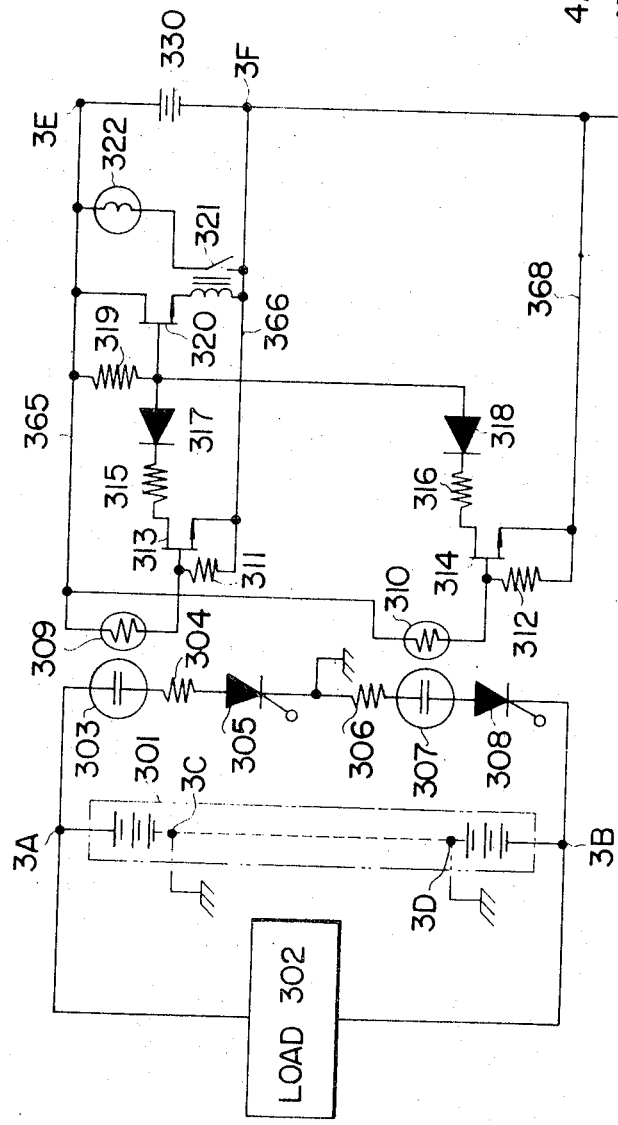
FIG. 3 is another embodiment of the circuit which utilizes a neon tube and a photoconductor element as the voltage detecting means.

In FIG. 3, another embodiment of the circuit according to the invention is disclosed which utilized a neon tube in circuit with a photoconductor. A load 302 is connected between the terminals 3A and 3B of the main battery. A neon tube 303 is connected between the terminal 3A and a resistor 304 which is connected to a source of reference potential through a thyristor 305. A neon tube 307 is connected between a resistor 306 which is connected to a source of reference potential and a thyristor 308 which is connected to the terminal 3B of the battery.

A photoconductive element 309 is connected between a line 365 which is connected to the positive terminal of the battery 330 and the base of a transistor 313. The emitter of the transistor 313 is connected to the lead 366 which is connected to the negative terminal of the battery 330 at node 3F. The base of the transistor 313 is also connected to the lead 366 through the resistor 311. The collector of the transistor 313 is connected to the base of the transistor 320 through a resistor 315 and a diode 317. The collector of the transistor 320 is connected to the lead 365 which in turn is connected to the positive terminal of the battery 330 at node 3E.

A photoconductive element 310 is connected between the lead 365 and the base of the transistor 314. The collector of the transistor 314 is also connected to the base of the transistor 320 through the resistor 316 and the diode 318. The base of the transistor 320 is also connected to the lead 365 through a resistor 319. The emitter of the transistor 314 is directly connected to the lead 368 which is in turn connected to the negative terminal of the battery 330 at node 3F. A resistor 312 is connected between the base of the transistor 314 and the emitter of the transistor 314 and to lead 368.

The coil of a relay 321 is connected to the emitter of the transistor 320 and the contact of the relay 321 is in circuit with an indicating lamp 322 which is connected between the leads 365 and 366.

The operation of the circuit of FIG. 3 is substantially the same as the operation of the circuit of FIG. 1. If the battery 301 is in a leakage state to ground at points 3C or 3D, the neon tube 303 or 307 is energized by triggering the thyristor 305 and 308 alternatively. The light from the neon tubes 303 and 307 causes the photoconductive elements 309 and 310 respectively to conduct and the outputs of the transistors 313 and 314 are transmitted to the transistor 320 through the AND gate comprising the diodes 317 and 318 and resistor 319. Thus, the lamp 322 is brightened by the switching operation of the relay being driven by the transistor 320.

When the thyristors 305 and 308 are used as the switching means, a direct current is caused to flow through the neon tubes 303 and 307 as a result of the leakage of the main battery 301. This occurs because a thyristor maintains itself in conductive state after the triggering operation to it has subsided.

Instead of the transmission of light between the neon tubes 303 and 307 and the corresponding photoconductive elements 309 and 310, transmission by the use of a magnetic flux signal as shown in FIG. 4 may be used.

Referring to FIG. 4, the flux generated by coil 401 is applied to a Hall element 402. When a direct voltage is applied to the Hall element 402 through a resistor 403 from a battery 404, a voltage is induced between the terminals 4C and 4D by the flux. The voltage between the terminals 4C and 4D is amplified by the DC amplifier 405 to provide an output signal between the terminals 4E and 4F.

The terminal 4A of the circuit of FIG. 4 on the coil 401 is connected to the terminal 3A of the battery or to the resistor 306, while the other terminal 4B is connected to the resistor 304 or the thyristor 308, instead of the neon tube 303 or 307. The terminal 4E of the DC amplifier is connected to the base of the transistor 313 or 314 and the other terminal 4F is connected to the line 366 or 368.

Instead of thyristors 305 and 308 as shown in FIG. 3, or thyristors 5 and 8 as shown in FIG. 1, a transistor or a mechanical switch may be used as the switching means. In this case, the transistor cannot maintain its conductive state after the voltage applied to its base has been reduced or eliminated. Therefore, when using a transistor or a mechanical switch, the voltage to be applied between the input terminal of the voltage detecting device must have an angular or pulse form. In such a case, a transformer may be used instead of the voltage detecting device. Thus in FIG. 1, a primary coil of the transformer is connected between points C and D or K and L, and a secondary coil of the transformer is connected between points E and F or M and N.

When two PNP type transistors are used as the switching means, the collectors of the transistors are connected to the points G and L respectively, while their emitters are connected to the points H and Q respectively. The bases of the transistors are connected to the terminals 2A and 2E in FIG. 2 respectively.

When two mechanical switches are used as the switching means in the circuit of FIG. 1, one switch is connected between the points G and H, while the other is connected L and P. The mechanical switches are driven periodically.

In using this invention, it is desirable that the input terminals and output terminals of the voltage detecting device be insulated from each other.

While a preferred system according to the present invention has been shown and described in detail along with various modifications, further modifications, embodiments and variations are contemplated within the spirit and scope of the present invention as defined by the following claims.

What is claimed is:

1. A leakage detecting circuit for detecting leakage from a source of power to a source of reference potential, said leakage detecting circuit comprising:
   a source of power including a positive terminal and a negative terminal;
   a first series circuit means comprising a first detecting means and a first switching means;
   a second series circuit means comprising a second detecting means and a second switching means; and
   a control circuit for operating the first and second switching means alternatively;
   said first series circuit means and said second series circuit means being connected in series between said positive and negative terminals of the power source, the connection between said first and second series circuit means being connected electrically to the source of reference potential;
   the first series circuit means being actuated by operating the first switching means whereby, when a leakage from the source of power to the source of reference potential occurs, a first circuit path having the first series circuit means, the terminal of the power source, the leakage, and the reference source is established;
   the second series circuit means being actuated by operating the second switching means whereby, when a leakage from the source of power to the source of reference potential occurs, a second circuit path having a second series circuit means, the terminal of the power source, the leakage and the reference source is established.

2. The circuit as set forth in claim 1 wherein said first and said second detecting means are each voltage detecting means respectively connected in series with said first and said second switching means.

3. The circuit as set forth in claim 2 wherein said source of reference potential is ground.

4. The circuit as set forth in claim 2 wherein said first and said second switching means are thyristors and said control circuit includes means for alternately actuating said thyristors.

5. The circuit as set forth in claim 4 wherein said source of power is a battery comprising a plurality of cells.

6. The circuit as set forth in claim 1 further including a first indicating means operatively connected to the output terminal of said first detecting means and a second indicating means operatively connected to said second detecting means.

7. The circuit as set forth in claim 6 wherein the relative magnitudes of the outputs of said first and second indicating means provide an indication of the location of the leakage of said source of power to said source of reference potential.

8. The circuit as set forth in claim 6 wherein the inputs of each of said detecting means are respectively electrically isolated from the outputs thereof.

9. The circuit as set forth in claim 2 wherein each of said first and said second detecting means comprises a neon tube and a photoconductive element responsive to said neon tube.

10. The circuit as set forth in claim 2 wherein each of said first and said second detecting means comprises a coil and a Hall element operatively responsive to the flux generated by said coil.

11. The circuit as set forth in claim 1 further including indicating means operatively connected to both of said first detecting means and said second detecting means.

* * * * *